July 8, 1969       J. CEDER       3,453,792
SPINDLE MOUNTING FOR STORM DOORS
Filed July 11, 1968
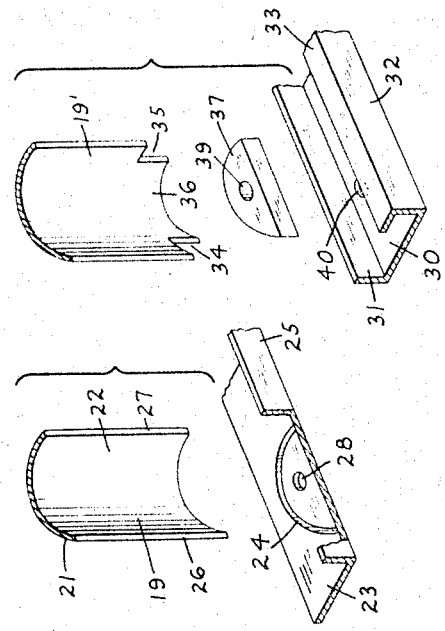
INVENTOR
JOSEPH CEDER
BY
Brumbaugh, Graves,
Donohue & Raymond
HIS ATTORNEYS

United States Patent Office 3,453,792
Patented July 8, 1969

3,453,792
SPINDLE MOUNTING FOR STORM DOORS
Joseph Ceder, Bloomingdale, N.J., assignor to International Aluminum Ltd., Moonachie, N.J., a corporation of Delaware
Continuation-in-part of application Ser. No. 650,071, June 29, 1967. This application July 11, 1968, Ser. No. 744,214
Int. Cl. E06b 3/70, 5/00; E04c 2/42
U.S. Cl. 52—455                                           2 Claims

ABSTRACT OF THE DISCLOSURE

An improvement in joints for attaching ornamental spindles to storm doors and the like in which spindles of concavo-convex or arcuate cross-section have their ends mounted in angular or channel-shaped strips provided with portions engaging at least the concave surfaces of the spindles to position them against movement enwise of the extrusions, the extrusions having abutments engaging the edges of the spindles to prevent them from rotating or turning in the extrusions and the extrusions are secured to frame elements of the door by concealed fastening means disposed adjacent the concave surfaces of the spindles and extending through the extrusions.

---

This invention is a continuation-in-part of my copending application Ser. No. 650,071 filed June 29, 1967. The invention relates to improvements in the manufacture of storm doors and the like, and more particularly to joints by means of which ornamental spindles and the like can be attached to storm doors or other articles.

Heretofore in the manufacture of doors and many other articles which have ornamental spindles of various shapes and forms, it has been customary to form the spindles on a lathe or by a molding operation, and either of solid or hollow formation, and then to secure the spindles in a frame or other supporting members by means of pegs, screws or the like to prevent their dislodgment or displacement. Similar procedures have been followed in the manufacture of aluminum storm doors which are composed of interconnected aluminum extrusions and are provided with such conventional elements as replaceable glass and screen sash, kick plates and the like, all joined by suitable corner brackets, screws and the like into a rigid assembly. The ornamental spindles are usually mounted in an area of the storm door above the kick plate and may be backed up by a glass storm sash or a screen sash which are interchangeable. The attachment of such solid or hollow spindles as well as the cost of such spindles is high, particularly because of the amount of material they contain and because of the labor costs of predrilling and inserting screws through the framing elements and into the ends of the spindles. Inasmuch as the spindles are not subjected to hard service conditions which would tend to damage them, the material in such solid or hollow spindles is greater than is required in normal service and hence is wasteful and, as indicated above, costly.

In accordance with the present invention, joints are provided for mounting ornamental spindles and the like which provide very substatial savings in material, greater ease of installation of the spindle and with the added advantage of having the elements for mounting the spindles concealed from view, at least from the exterior of the door or the like.

More particularly, in accordance with the present invention, the spindles utilized in the storm doors are of concavo-convex cross-section throughout, that is, they are not completely tubular elements and the ends of the spindles are mounted against complementally shaped supporting elements which largely prevent movement of the spindles relative to supporting strips or channel members having flanges which serve to anchor the ends of the spindles against movement in any direction.

Further in accordance with the invention, the strips are secured to the framing elements of the door by means of screws or the like which pass through the strips or the channels in which the ends of the spindles are mounted in areas which are concealed by the spindles thereby lending additional attractiveness to the door while at the same time greatly simplifying the connection of the spindles and the strips supporting them to the frame elements of the door.

For a better understanding of the present invention, reference may be had to the accompanying drawings, in which FIGURE 1 is a front elevation of a typical storm door having spindles mounted therein in the manner embodying the present invention;

FIGURE 2 is an exploded perspective view of one form of joint for mounting a spindle in the storm door;

FIGURE 3 is an exploded perspective view of a modified form of joint;

FIGURE 4 is a perspective view of still another form of joint embodying the invention;

FIGURES 5, 6 and 7 are longitudinal sectional views of the joints and portions of the spindle and frame corresponding to FIGURES 2, 3 and 4; and FIGURE 5a is a developed view of the strip 23 of FIGURES 2 and 5 before formation of the flange 25 for that strip.

By way of illustration of the invention, FIGURE 1 discloses a storm door 10 having an outer frame 11 formed of aluminum extrusions and including a pair of permanently mounted glass panels 12 and 13, a removable glass or screen sash 14, a lower kick plate 15 and an interchangeable glass or screen sash 16 mounted between transverse frame members 17 and 18. The arrangement of the kick plates, the glass panels 12 and 13 the kick plate 15 and the interchangeable sashes 14 and 16 is subject to wide variation and any suitable mounting means therefor may be used inasmuch as they do not form a part of the present invention.

As shown in FIGURE 1, a series of ornamental spindles 19, 20, etc. are mounted between the frame members 17 and 18 and in front of the sash 16. The shape or contour of the spindles is unimportant and may be modified depending upon the decorative appearance sought.

As shown in FIGURE 2, the spindles 19 and 20 are of hollow, concavo-convex cross-section throughout their lengths and in the form of the spindles illustrated, the outer surface 21 and the inner surface 22 of each spindle are arcuate although they may be a non-circular contour, for example, polygonal or the like, as may be required, all of these shapes falling within the terms "concavo-convex," "concave" and "convex" as used herein.

The opposite ends of the spindle 19 are similar in shape, although they may be different, and are received in strips 23, each of the ends of the spindle being received in an arcuate slot 24 in the base of the strip. As best shown by FIGURE 5, each of slots 24 passes vertically through the entire strip 23 in which it is formed. The slot 24 is generally complemental to the end of the spindle but need not be in continuous engagement with the spindle 19 throughout its entire inner and outer periphery. At least three-point contact is reqiured, however, to properly retain the spindle against rattling. A right-angularly related flange 25 is provided on the strip 23 and engages the parallel edges 26 and 27 on the spindle to prevent it from rotating in the slot 24 relative to the strip 23. It will be understood, however, that the ends of the slot 24 may stop short of the flange 25 so that the ends of the slot engage the parallel edges 26 and 27 on the spindle and thus retain it against rotation.

Within the area defined by the slot 24 and the flange 25 and concealed by the spindle 19, is a hole 28 for receiving a screw 29 by means of which the strip 23 is secured to one of the frame members 17 or 18. In this way, when the strips 23 and the spindles are assembled, they can be inserted between the frame members 17 and 18 and the screws 29 inserted through the openings 29 and screwed into preformed or predrilled holes in the framing elements to secure the entire spindle and strip unit in the opening with each of the spindles retained securely in position and with the securing screws 29 concealed at least from the front or outside of the door.

FIG. 5a is a view of a portion of the aluminum strip 23 before the same has been worked to form the flange 25. The slots 24 are conveniently formed in the flat strip 23 by the use of a punch or die which punches out the metal of the strip so as to leave behind the mentioned slots. As shown the inward ends of all of slots 24 lie along a line 6 running transversely of the strip 23 to divide it into a forward portion 7 and a rearward portion 8. Because slots 24 pass vertically all the way through strip 23, those slots, if connected to each other, would divide the strip 23 into two separate pieces 7 and 8 of which neither would be able to restrain from movement the corresponding ends of the spindles 19, 20. Because, however, the slots 24 are transversely spaced along strip 23, the rearward portion 8 is secured to forward portion 7 by bridges 9 formed between the spaced slots by the metal of the strip.

Because of the described construction of the slotted strips 23 whereby the front and rear portions of the strips are fastened together despite the passage of slots 24 entirely through the strips, those strips and the spindles can be assembled together as a sub-unit without the need for first separately fastening the front and rear portions 7 and 8 of the strips to the corresponding frame members 17 and 18 of the door. Simultaneously, the advantage is realized that although the aluminum strips are relatively thin, the passage of the slots 24 all the way through the strips permit the ends of the spindles to be received into the slots to the full thickness of the strips to thereby provide maximum rigidity of the joints formed between the strips and the spindles. In this connection, each slot 24 may have a width of 0.060" whereas the thickness of the spindles may be 0.055" so as to provide a nominal clearance of 0.005" for the seating of a spindle in a slot. Any looseness in the joint which would tend to be caused by such clearance is, however, completely removed by utilizing slightly different radii of curvature for the slots and for the undeformed across section of the spindle ends so that such ends can be inserted into the slots only by force fitting. Because of such force fit, the joint between each strip and each spindle can be made tight enough so that (when the strips are flanged as about to be described), the resulting subassembly is self-coherent and rigid under its own weight and can readily be inserted in between the member 17 and 18 to then be fixedly mounted in place in front of the sash 16.

Coming now to the flange 25, because strips 23 are relatively thin, they are flexible when flat (FIG. 5a) to the point where an assembly of the spindles and flat strips would be insufficiently rigid to permit convenient forming of the assembly away from the door and subsequent transfer of the assembly to mounting position within the door frame. Such latent defect is, however overcome by bending or otherwise shaping at least part of the rear portion 8 of each of the flat strips 23 (FIG. 5a) into the described flange 25 whose presence imparts to the strip the needed structural strength and rigidity. The bend line for the flange can conveniently be the line 6 (FIG. 5a).

If desired, however, the bend line can be somewhat to the rear of line 6 so that (as earlier described) the spindles are out of contact with the flange and are held against rotation by engagement of the spindle edges with the ends of the slots 24 in which the spindles are seated. Alternatively, the bend line for the flange can be somewhat forward of line 6, in which case (as earlier described) it is at least partly the contact between the spindles and the flanges which holds the spindles against rotation. In all three cases, however, the primary function of the flange 25 is to strengthen and rigidify the strip 23 against bending of the strip in the transverse plane normal to strip portion 7.

FIG. 3 shows a modified form of joint in which instead of using a flat strip with a single flange thereon, a channel member 30 is provided having a front flange 31, a back flange 32 and a top flange 33 extending toward the front flange. The spindle 19' has notches 34 and 35 in its upper and lower ends leaving a middle portion 36 which fits between the flange 31 and the forward edge of the flange 32 with the edges of the spindle overlying the flange 33. In this form of joint, a semicircular or other complementally shaped block 37 engages the inner surface of the portion 36 of the spindle with the outer face of the spindle engaging the flange 31 to hold the spindle in position. A screw 38 passes through an opening 39 in the block and an opening 40 in the channel member 30 to secure the channel 30, block 37 and spindle 19' to the framing element 18' of the door. The upper end of the spindle is similarly supported.

The modification shown in FIGS. 4 and 7 differs in that the spindle 19" is of slightly lesser dimensions from front to back and thus can be received between the front flange 31' and the overlying flange 33' of the channel member 30' and is positioned by means of the semicircular block 37' secured in the channel and to the door frame 18" by means of a screw 38' as described above.

In each of these modifications, the slot 24 or the positioning block 37 or 37' retains the spindle against movement lengthwise of the strip or channel and the spindle is further retained against movement in any direction of either by the ends of the slot 24 or the flange 25 or by engagement with the flanges 31 and 33 or 31' and 33' of the channel members. In this way, without detracting from the ornamental appearance of the door, spindles which contain much less material than the prior spindles can be anchored securely against movement and rattling with a minimum of material and labor and in a much shorter period of time than heretofore, thereby contributing to manufacturing economies.

It will be understood that the shape of the spindles can be modified depending upon the ornamental effect sought and that the joints described above can be used in other fields than the storm door field. Accordingly, the forms of the invention described herein should be considered as illustrative and not as limiting the scope of the invention as defined in the following claims.

I claim:

1. In an aluminum storm door having a kickplate and having above such kickplate a bottom sash disposed between a pair of vertically spaced aluminum frame members extending transversely across said door, a protective and ornamental shielding on the outside of said door for said bottom sash, said shielding comprising, an array of vertically extending transversely-spaced aluminum extrusion spindles set in between said frame members on the front side of said sash, said spindles being each of horizontal concavo-convex cross section with the concave side of each spindle being towards said sash, a pair of transversely-extending aluminum-extrusion spindle-holding strips on opposite ones of said frame members on the sides of such members towards each other, each of said strips having formed therein a plurality of transversely-spaced concavo-convex slots extending vertically through the strip with the concave side of said slots towards said sash, the slots in each strip being transversely spaced from each other along a common line running transversely of the strip to divide such strip into a front portion away from said sash and a rear portion joined to said front portion by bridges formed by the metal of the strip between said transversely spaced slots, at least part of said rear portion of each strip being angled outwardly from the adjacent frame member to provide a strengthening flange for such strip, the slots in said two strips providing sockets in which opposite ends of said spindles are received, and fastening means by which each of said two strips is secured to its corresponding frame member so as to fixedly mount said strips and spindles in place in front of said sash.

2. The combination set forth in claim 1 in which the concave sides of the slots in each strip are defined by forwardly projecting tabs forming parts of the said rear portion of such strip, and in which said fastening means for each strip comprises a plurality of screws of which each passes vertically through one of said tabs of such strip and thence into the corresponding frame-member.

References Cited

UNITED STATES PATENTS

| | | | |
|---|---|---|---|
| 519,663 | 5/1894 | Carr | 52—311 |
| 596,773 | 1/1898 | Guillaume | 52—667 X |
| 1,734,660 | 11/1929 | Williams et al. | 52—667 X |
| 2,371,921 | 3/1945 | Tucker | 52—667 |
| 2,728,388 | 12/1955 | Noecker | 160—104 X |
| 2,757,765 | 8/1956 | Fitzgerald | 52—669 |
| 3,254,462 | 6/1966 | Toler | 52—455 X |

ALFRED C. PERHAM, *Primary Examiner.*

U.S. Cl. X.R.

49—50; 52—202, 507, 667, 669; 160—104